J. K. DELANO.
ELECTRIC STARTING DEVICE FOR EXPLOSIVE ENGINES.
APPLICATION FILED DEC. 20, 1912.
1,287,575.
Patented Dec. 10, 1918.
5 SHEETS—SHEET 5.
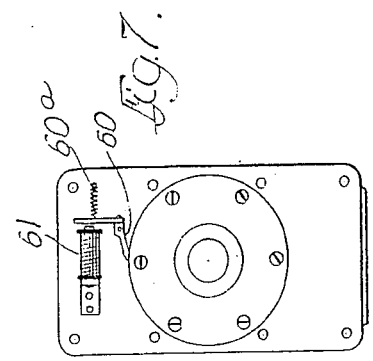
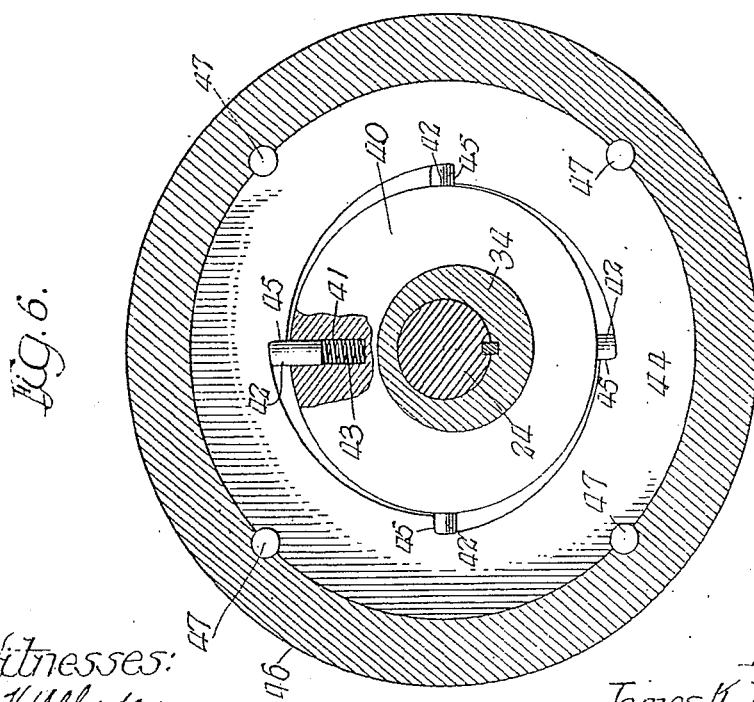
Witnesses:
Inventor
James K. Delano

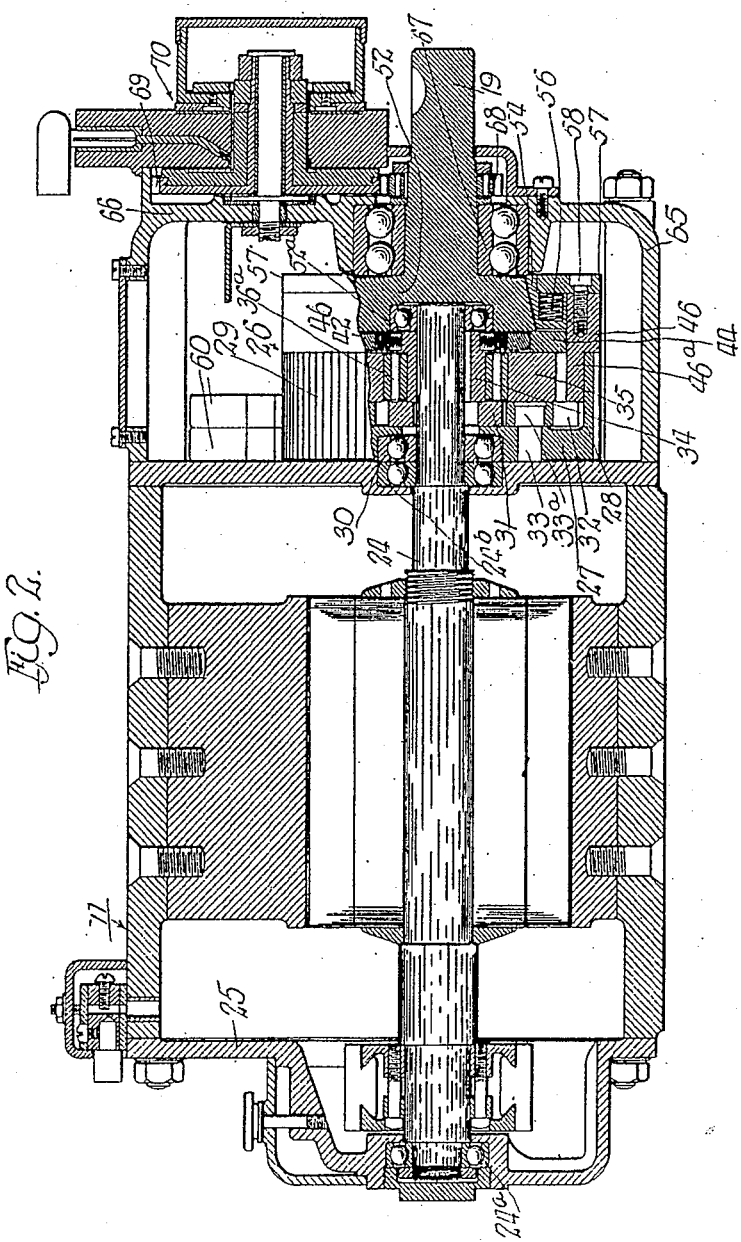

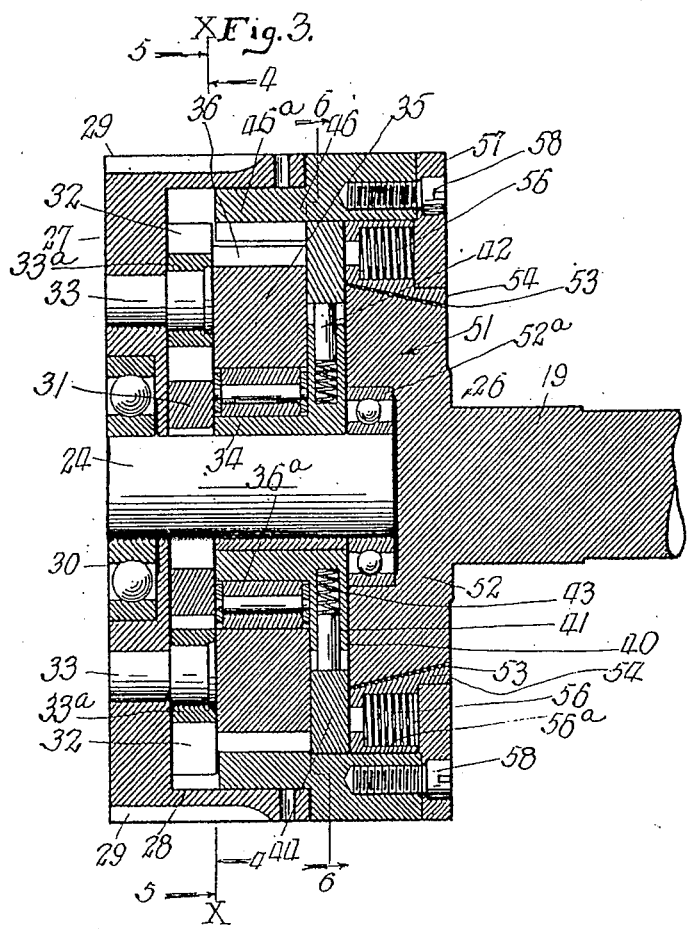

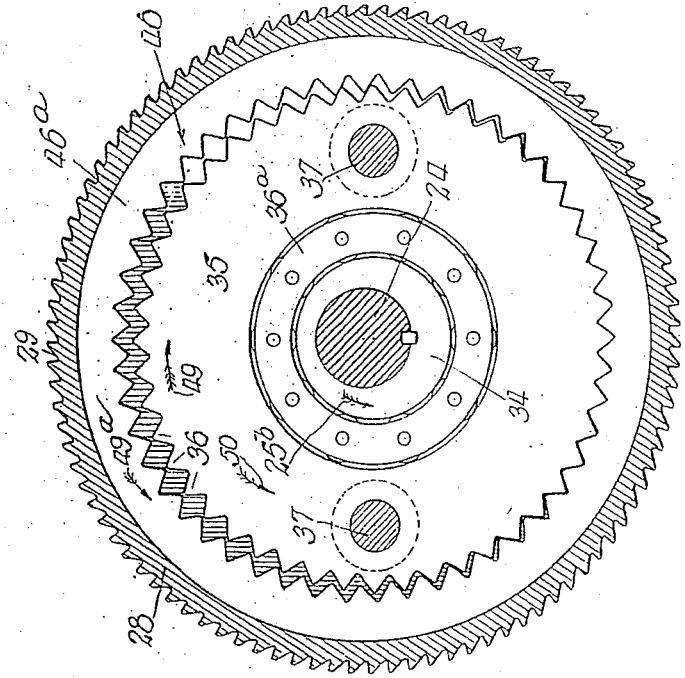
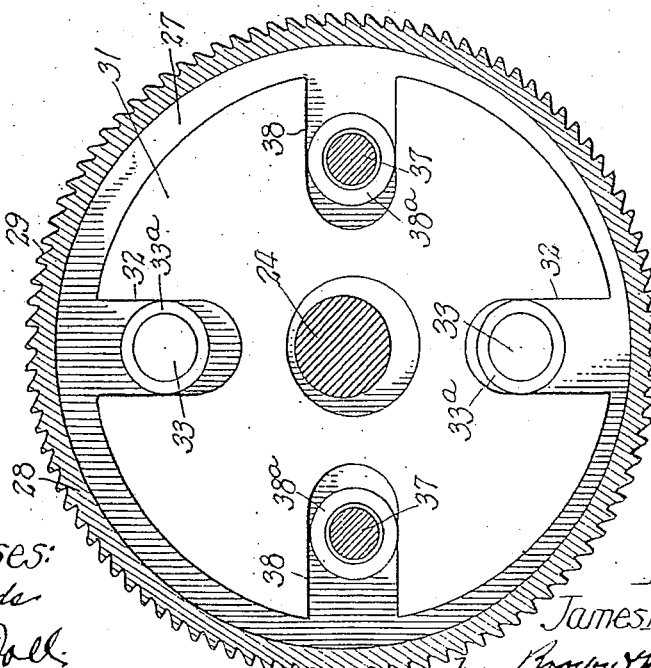

UNITED STATES PATENT OFFICE.

JAMES K. DELANO, OF INDIANAPOLIS, INDIANA.

ELECTRIC STARTING DEVICE FOR EXPLOSIVE-ENGINES.

1,287,575.   Specification of Letters Patent.   Patented Dec. 10, 1918.

Application filed December 20, 1912. Serial No. 737,815.

*To all whom it may concern:*

Be it known that I, JAMES K. DELANO, a citizen of the United States, and a resident of Indianapolis, in the county of Marion and State of Indiana, have invented certain new and useful Improvements in Electric Starting Devices for Explosive-Engines; and I do hereby declare that the following is a full, clear, and exact description thereof, reference being had to the accompanying drawings, and to the letters of reference marked thereon, which form a part of this specification.

This invention relates to a speed reducing gearing more particularly adapted for use in connection with a starting system for internal combustion engines and consists of the matters hereinafter described and more particularly pointed out in the appended claims.
One of the objects of the present invention is to produce a neat, simple and compact gearing mechanism which may be interposed between the crankshaft of an internal combustion engine (usually an automobile engine) and a small motor generator carried upon said engine. My improved gearing mechanism when driven by said motor generator, (when the same is acting as a motor), transmits the rotation thereof to the engine crank shaft at a reduced speed and when said crank shaft is well under momentum, my improved gearing mechanism will act as a means for driving said motor generator (as a generator) from said engine crank shaft so that said motor generator will charge a storage battery from which current may be had for any purpose, including the starting of said motor generator as a motor to provide for the initial movement for said crank shaft.

In the drawings:

Fig. 2 is a view representing a longitudinal central section through the motor generator and my improved speed reducing gearing.

Fig. 3 represents a horizontal section on an enlarged scale of my improved speed reduction gearing and clutch mechanism, by means of which the motor generator shaft is operatively connected with the crank shaft of the automobile engine.

Fig. 4 is a view representing a vertical section through Fig. 3 in a plane indicated by the lines $x$—$x$ and looked at in the direction indicated by the arrows 4—4.

Fig. 5 is a view representing the same vertical section but looked at in the direction of the arrows 5—5 of Fig. 3.

Fig. 6 is a view representing a vertical section through Fig. 3 in a plane indicated by the line 6—6 thereof.

Fig. 7 is a detail end elevational view which will be more specifically referred to later.

Figure 1:
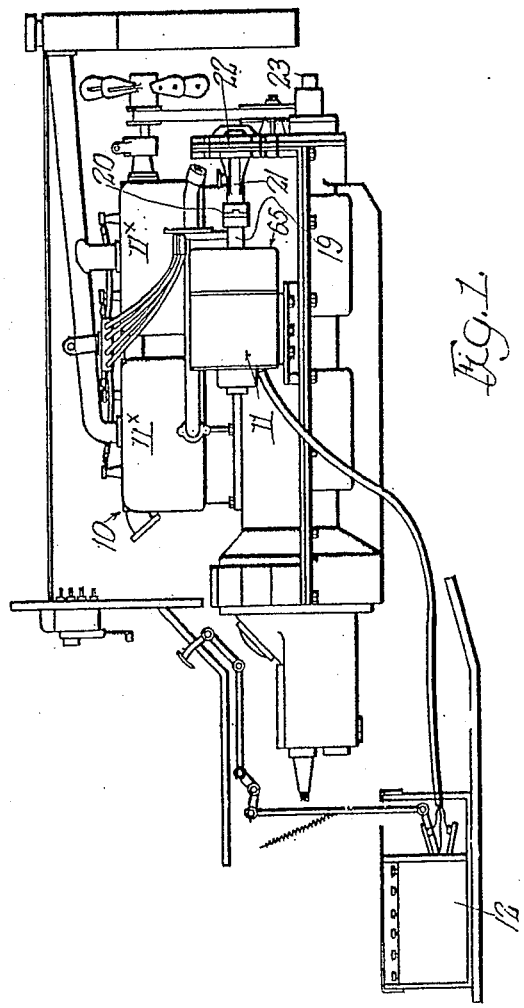
Figure 1 illustrates a view in side elevation of an automobile engine illustrating the manner in which my improved gearing mechanism and an associated motor generator for driving the same is supported upon said engine.

Referring now to that embodiment of my invention illustrated in the drawings, 10 indicates a gasolene engine (see Fig. 1) of any familiar type used in driving automobiles. 11 indicates a motor-generator which is adapted, when supplied with current, to run as a motor to start the engine shaft and, after the engine shaft is running under its own power, at the necessary speed, to run as a generator and supply electric current for the ignition of the engine, for lighting purposes and for charging a storage battery which supplies current for the ignition when starting and running the engine. Said motor-generator is mounted on the crank case of the engine adjacent the engine cylinders 11$^x$. 12 indicates a storage battery which may be mounted in any convenient place on the automobile frame.

The motor-generator shaft operates, through a speed-reduction connection, presently to be described, a shaft 19 (see Figs. 1 and 2,) which is connected by a suitable coupling 20 to a shaft 21, that in turn is connected by gearing inclosed in a casing 22 to the crank-shaft 23 of the engine. Thus, when the motor-generator is operating as a motor it acts to drive the engine crank-shaft.

The speed reduction connection by means of which the motor-generator shaft is operatively connected to the shaft 19 above referred to is constructed as follows:—24 indicates the shaft of the motor-generator 11 (see Fig. 2) which is of familiar construction. Said motor-generator is inclosed in a suitable casing 25 in the end walls of which the shaft 24 is rotatively mounted by means of suitable ball-bearings 24ª, 24ᵇ. The motor-generator shaft 24 is prolonged forwardly beyond the motor-generator casing, where it has mounted upon it a speed reduction gearing, indicated as a whole by the numeral 26, and comprising the following: On the shaft 24 adjacent the end of the motor-generator casing is rotatively mounted a disk 27 provided on its periphery with a forwardly projecting, annular flange 28 in the outer surface of which are formed ratchet teeth, the same thus constituting a ratchet-gear 29. The disk 27 is recessed on its face adjacent the motor-generator casing to receive a ball race 30 to provide an antifriction bearing for the ratchet-gear disk on the shaft 24. Next adjacent to the front face of the disk 27 and within its flange 28 there is mounted loosely on the shaft 24 a floating eccentric plate 31 (see Figs. 3 and 4) provided with diametrically opposite, radially extending notches 32, 32. Within said notches engage pins 33, 33, projecting forwardly from the face of the disk 27, said pins as shown being secured in suitable recesses or apertures in said disk. The pins are preferably provided with antifriction sleeves 33ª which have direct bearing engagement with the sides of the notches 32.

On the shaft 24 adjacent to the front face of the floating eccentric plate 31 there is keyed (see Fig. 5) a cylindric sleeve 34, having its central axis placed eccentrically with respect to the central axis of the shaft. A large gear 35 having external teeth 36 is rotatively mounted on said sleeve, an antifriction roller cage 36ª being preferably interposed between said gear and the eccentric sleeve 34. 37, 37 indicate pins extending rearwardly from the rear face of the gear 35, and engaging in diametrically opposite, radially extending notches 38, 38 formed in the floating plate 31 intermediate the other notches 32, 32 therein, and, as shown, at angular distance therefrom of 90 degrees. As in the case of the other pins, sleeves 38ª are preferably placed on said pins to provide antifriction bearing between said pins and the sides of said notches. It is apparent that any rotative movement of the gear 35 will be communicated by the pins 37 to the floating plate 31 and thence through the pins 33 to the ratchet-gear 29, while the said gear 35 may be moved radially in its plane by the eccentric sleeve on which it is mounted without effect on said ratchet gear, by reason of the radial play of said pins in their respective notches and of the floating movement of said floating plate.

At the forward end of the eccentric sleeve 34 there is fixed thereon an annular flange 40, (see Fig. 6) which carries a plurality of spring controlled pawls 42. Said pawls, as shown, are formed by radially arranged pins set in radial recesses 41, in the peripheral edge of the flange 40, there being, as shown, four of such recesses spaced apart at distances of 90 degrees. 43 indicates coiled springs interposed between the inner ends of the pins 42 and the bottoms of said recesses.

A flat ring 44 surrounds the flange 40 of the eccentric sleeve. Said ring has a plurality of ratchet teeth 45 on its inner circumference adapted for engagement by the spring controlled pawls 42.

46 indicates an internal gear rigidly attached upon the outer circumference of the flat ring 44, said ring and gear being non-rotatively connected together, as shown, by means of dowel-pins 47. Said internal gear is formed on an annular band 46ª, which projects forwardly and rearwardly beyond the plane of the ring 44, the rearward projection constituting the internal gear proper and having gear teeth cut on its inner periphery. Said gear part of the band is of reduced diameter and fits loosely within the flange of the disk 27 on which the ratchet gear 29 is formed. The internal gear 46 is of larger diameter than the external gear 35 with which it is engaged and the construction is such that as the eccentric sleeve 34 is rotated by the motor-generator shaft 24 it will cause the external gear 35 to roll upon the internal gear 46, and, as said external gear, being of smaller diameter, has a less number of teeth than the internal gear 46, this rolling of the gear 36 about within the gear 46 will produce a relative rotative movement between the said external gear and the internal gear in opposite directions. Thus, if the shaft 24 rotates counter-clockwise as viewed in Fig. 5, indicated by the arrow 25ᵇ therein, the external gear 35 will be or tend to be rolled in the same direction (indicated by the arrow 50) and will be caused to rotate in the opposite direction, or clockwise (as indicated by the arrow 49) with reference to the internal gear 46. Should the external gear be held against rotation the rotative movement will be imparted to the internal gear in the direction of the arrow 49ª (Fig. 5), and this rotation of the internal gear will be at a speed greatly less than that of the shaft 24, as is readily apparent, the reduction depending upon the difference between the number of teeth on the internal gear and the number of teeth on the external gear.

The internal gear is connected to the hereinbefore mentioned shaft 19, that is geared to the engine shaft, by means of an overload slip clutch, (see Fig. 3) indicated as a whole by the numeral 51. Said clutch includes a forwardly tapered member 52 fixed to the shaft 19 and rotatively mounted on the end of the motor-generator shaft 24. The rear

MISSING PAGE TEMPORARY NOTICE

PATENT # 1287575 FOR ISSUE DATE 12-10-1918 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

text page 3 to end